(12) United States Patent
Nakamura

(10) Patent No.: US 9,000,356 B2
(45) Date of Patent: Apr. 7, 2015

(54) ENCODER

(71) Applicant: Canon Kabushiki Kaisha, Tokyo (JP)

(72) Inventor: Hitoshi Nakamura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 291 days.

(21) Appl. No.: 13/716,591

(22) Filed: Dec. 17, 2012

(65) Prior Publication Data

US 2013/0163654 A1  Jun. 27, 2013

(30) Foreign Application Priority Data

Dec. 27, 2011  (JP) .................................. 2011-285283

(51) Int. Cl.
*G01D 5/34* (2006.01)
*H04L 1/20* (2006.01)
*G01D 5/347* (2006.01)

(52) U.S. Cl.
CPC .............. *H04L 1/203* (2013.01); *G01D 5/3473* (2013.01)

(58) Field of Classification Search
USPC ........................................ 250/231.13–231.18
See application file for complete search history.

(56) References Cited

U.S. PATENT DOCUMENTS 6,654,508 B1 * 11/2003  Markham ..................... 382/291

FOREIGN PATENT DOCUMENTS

JP  2001-091237 A  4/2001
JP  2004-317411 A  11/2004

* cited by examiner

*Primary Examiner* — Thanh Luu
(74) *Attorney, Agent, or Firm* — Rossi, Kimms & McDowell LLP

(57) ABSTRACT

An encoder (10) includes a sensor (1) configured to illuminate light on a single scale (100) to detect two phase signals having periods different from each other, an error signal generator (2) configured to arrange accumulated amounts of phase changes of the two phase signals when the scale (100) and the sensor (1) are relatively displaced from each other by a predetermined displacement so as to obtain two accumulated phase signals and to obtain a difference between the two accumulated phase signals so as to generate an error signal that is obtained by removing an accumulated phase component corresponding to the predetermined displacement, and an interpolation error detector (3) configured to average the error signal by using at least one of periods of the two phase signals so as to detect an interpolation error contained in at least one of the two phase signals.

5 Claims, 3 Drawing Sheets

ENCODER

BACKGROUND OF THE INVENTION

1. Field of the Invention

The present invention relates to an encoder which detects an interpolation error of a phase signal.

2. Description of the Related Art

Japanese Patent Laid-Open No. 2004-317411 discloses a correcting apparatus of an absolute value encoder that includes a reference encoder having accuracy higher than that of the absolute value encoder (an encoder that is to be corrected). In a configuration of Japanese Patent Laid-Open No. 2004-317411, the absolute value encoder and the reference encoder are mounted on the same axis, and a corrected value is generated based on a difference of detection position information of the two encoders. Then, correcting a detected value of the absolute encoder using this corrected value, highly-accurate position information can be obtained.

Japanese Patent Laid-Open No. 2001-91237 discloses a generating apparatus of an error correction value that combines a detector being measured and a reference detector and that measures an error based on a difference between a position detection value of the detector being measured and a position detection value of the reference detector so as to generate a corrected value.

However, in the configurations disclosed in Japanese Patent Laid-Open No. 2004-317411 and Japanese Patent Laid-Open No. 2001-91237, a highly-accurate reference encoder is necessary and therefore manufacturing cost of the encoder is increased. In addition, when the encoder being corrected (the detector being measured) and the reference encoder (the reference detector) are attached to each other, a residual error of the error caused by an attachment error may be generated. Furthermore, after these encoders are incorporated, it may be necessary to remove the encoders in order to readjust the corrected value.

SUMMARY OF THE INVENTION

The present invention provides a highly-accurate encoder at low cost.

An encoder as one aspect of the present invention includes a sensor configured to illuminate light on a single scale to detect two phase signals having periods different from each other, an error signal generator configured to arrange accumulated amounts of phase changes of the two phase signals when the scale and the sensor are relatively displaced from each other by a predetermined displacement so as to obtain two accumulated phase signals, and to obtain a difference between the two accumulated phase signals so as to generate an error signal that is obtained by removing an accumulated phase component corresponding to the predetermined displacement, and an interpolation error detector configured to average the error signal by using at least one of periods of the two phase signals so as to detect an interpolation error contained in at least one of the two phase signals.

Further features and aspects of the present invention will become apparent from the following description of exemplary embodiments with reference to the attached drawings.

DESCRIPTION OF THE PREFERRED EMBODIMENTS

Figure 1:
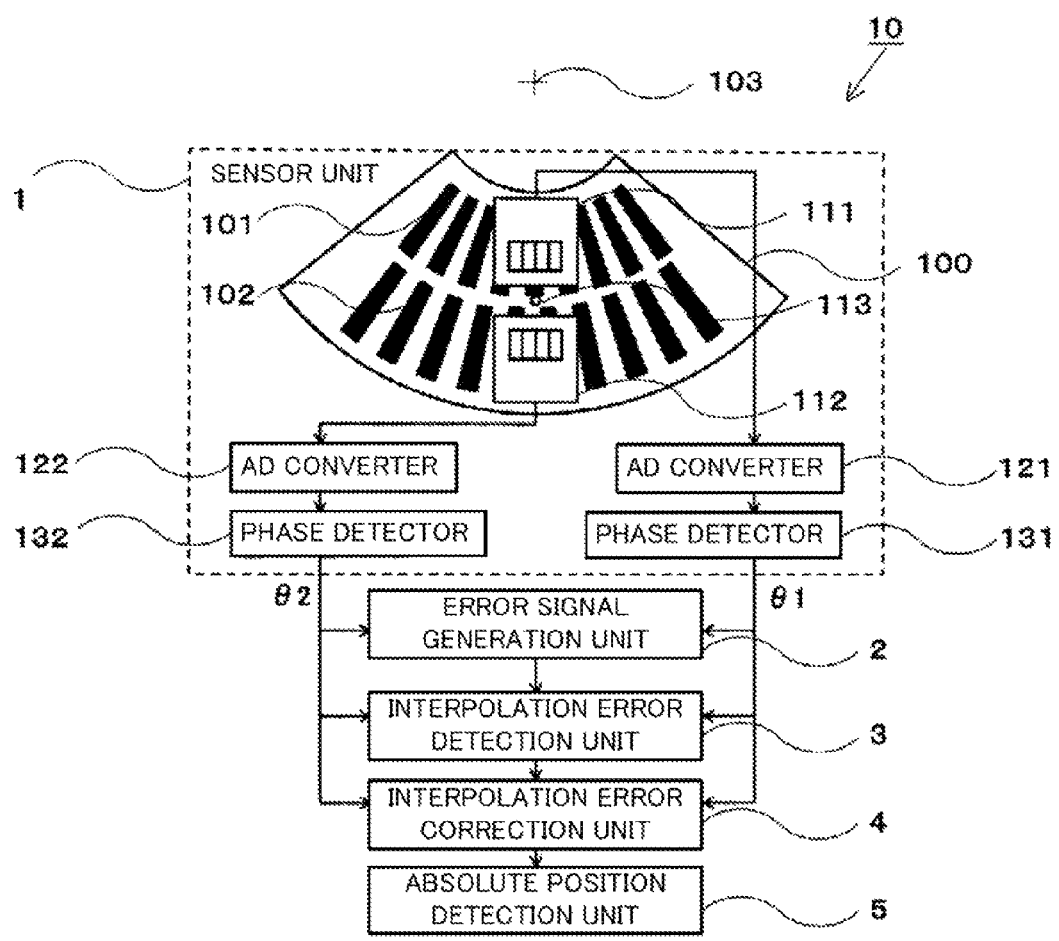
FIG. 1 is a block diagram of an encoder in the present embodiment.

Exemplary embodiments of the present invention will be described below with reference to the accompanied drawings. In each of the drawings, the same elements will be denoted by the same reference numerals and the duplicate descriptions thereof will be omitted.

First of all, referring to FIG. 1, aconfiguration of an encoder in the present embodiment will be described. FIG. 1 is a block diagram of an encoder 10 (a position detection apparatus). As illustrated in FIG. 1, the encoder 10 is an absolute encoder that is configured by including a sensor unit 1 (a sensor), an error signal generation unit 2 (an error signal generator), an interpolation error detection unit 3 (an interpolation error detector), an interpolation error correction unit (an interpolation error corrector), and an absolute position detection unit 5 (an absolute position detector).

The sensor unit 1 is configured by including a scale 100 having tracks 101 and 102, sensors 111 and 112, a light source 113, AD converters 121 and 122, and phase detectors 131 and 132. The scale 100 is attached so that a rotation center 103 is aligned on a rotational shaft of an object to be measured (not shown), and it is relatively displaced from the sensors 111 and 112 in conjunction with a rotational displacement of the object to be measured.

The tracks 101 and 102 are provided with a reflective portion and a non-reflective portion alternately with periods of 9 degrees and 10 degrees, respectively. Light illuminated from the light source 113 is reflected on the reflective portions of the tracks 101 and 102, and the reflected lights are detected by the sensors 111 and 112, respectively. According to the relative displacement of the scale 100 and the sensors 111 and 112, the reflected lights detected by the sensors 111 and 112 are also changed. The sensors 111 and 112 output two-phase sine wave signals having one period with respect to the displacements of 9 degrees and 10 degrees relative to the tracks 101 and 102, respectively. Therefore, when the scale 100 and the sensors 111 and 112 are displaced from each other by 90 degrees, the two-phase sine wave signals having 10 periods and 9 periods are outputted, respectively. As each of the tracks 101 and 102, a track on which a transmissive portion is formed instead of the reflective portion of the light, i.e. a track in which a transmissive portion and a non-transmissive portion of the light are alternately formed, may also be used. In this case, the sensors 111 and 112 detect lights transmitted through the tracks 101 and 102 (transmitted lights), respectively.

The AD converters 121 and 122 perform AD conversions for the two-phase sine wave signals (analog signals) outputted from the sensors 111 and 112 respectively so as to output digital signals. The phase detectors 131 and 132 perform arctangent calculation for the two-phase sine wave signals (the digital signals) which have been obtained by performing the AD conversions so as to output phase signals θ1 and θ2, respectively. Thus, the sensor unit 1 illuminates the light on a single scale 100 so as to detect the two phase signals θ1 and θ2 having periods different from each other.

An error signal generation unit 2, for the phase signals θ1 and θ2, arranges accumulated change amounts of phases corresponding to a predetermined displacement so as to obtain the difference of them, and generates an error signal E that is obtained by removing an accumulated phase component corresponding to the displacement. An interpolation error detection unit 3 averages the error signal E by the period of each of the phase signals θ1 and θ2, and detects interpolation errors E1 and E2 contained in the phase signals θ1 and θ2, respectively. An interpolation error correction unit 4 subtracts the interpolation errors E1 and E2 for the phase signals θ1 and θ2 respectively so as to generate corrected phase signals θC1 and θC2 that are obtained by correcting the interpolation errors. An absolute position detection unit 5 detects an absolute value of an object (an object to be measured) using the corrected phase signals θC1 and θC2.

Next, referring to FIGS. 1 and 2A to 2F, a method of detecting an interpolation error, a method of correcting the interpolation error, and a method of detecting the absolute position using the encoder 10 will be described. FIGS. 2A to 2F are diagrams of illustrating signals of the encoder 10.

First of all, a processing in the error signal generation unit 2 will be described. A relative angle change of 9 degrees between the sensor 111 and the scale 100 corresponds to a phase change of 2π (one period) of the phase signal θ1 which enters the sensor 111 (which is obtained in accordance with a change of an intensity of light). In addition, a relative angle change of 10 degrees between the sensor 112 and the scale 100 corresponds to a phase change of 2π (one period) of the phase signal θ2 which enters the sensor 112 (which is obtained in accordance with the change of the intensity of light). These periods (an amount of the relative angle change between the sensor and the scale during the change of the phase signal of 2π) relate to the period of the scale (a period, a pitch, and an angle of array of the pattern in a circumferential direction).

In the present case, when the phase signal θ1 is multiplied by 9/10, both have the phase displacement of 2π for the relative displacement of 9 degrees. Accordingly, the error signal E where the displacement component has been removed can be obtained by taking the difference between these signals. In other words, the error signal E where the displacement component has been removed can be obtained by converting at least one of the phase signals based on the periods of the two scales that correspond to the respective two phase signals.

Figure 2A:
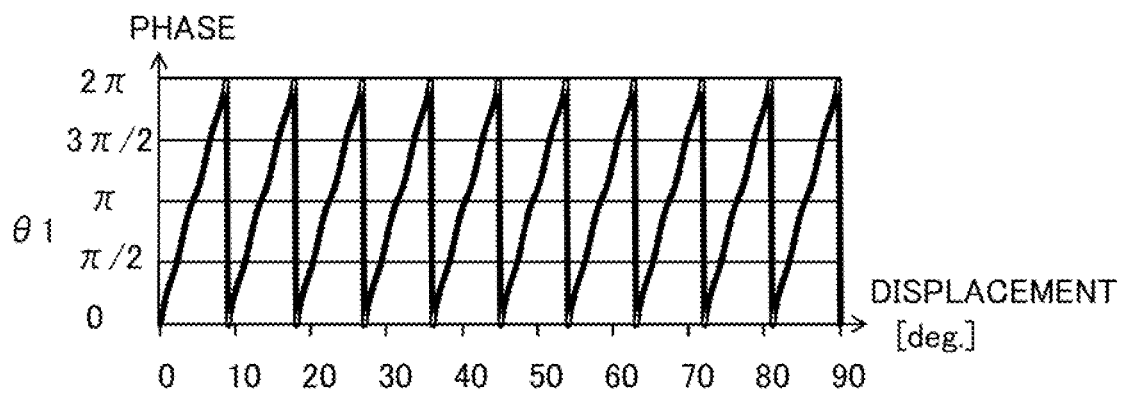
FIGS. 2A to 2F are diagrams of illustrating signals of the encoder in the present embodiment.
Figure 2B:
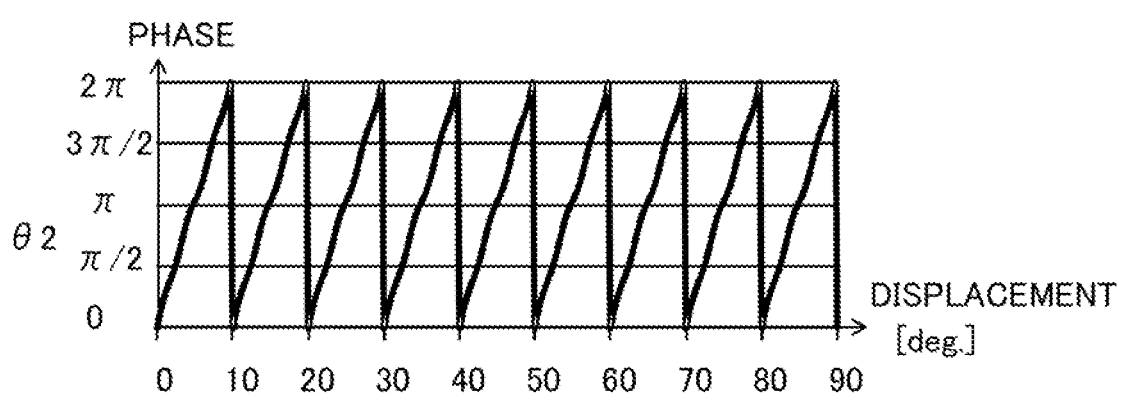
Figure 2C:
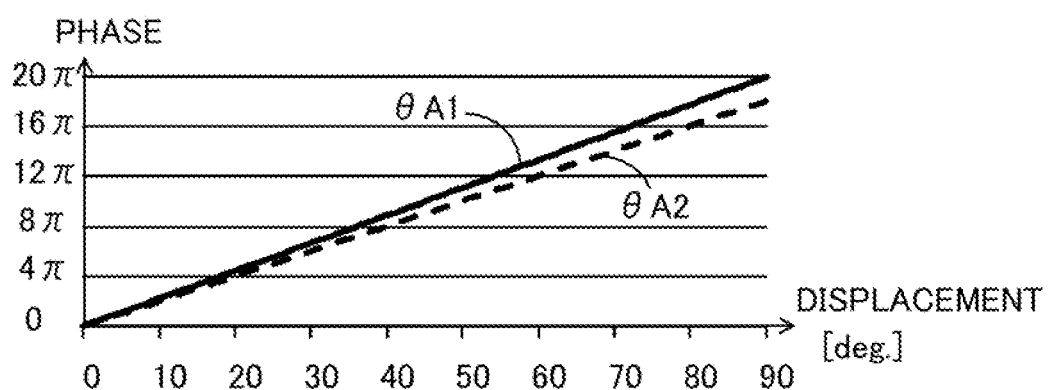

The phase signals θ1 and θ2, as illustrated in FIGS. 2A and 2B, only indicate values within one period, i.e. values of a phase from 0 to 2π. Therefore, when the folding back from 2π to 0 is generated, initial phases of the phase components of the phase signals θ1 and θ2 are shifted. Accordingly, as indicated by θA1 and θA2 in FIG. 2C, the folding back from 2π to 0 is counted for each of the phase signals θ1 and θ2, and the phase signals θA1 and θA2 (accumulated amounts) obtained by adding 2π×(the number of folding backs) to the phase signals θ1 and θ2 (the accumulated amount) are calculated. When the interpolation errors contained in the phase signals θA1 and θA2 are E1(x) and E2(x) respectively, the phase signals θA1 and θA2 are represented by the following Expressions (1) and (2) respectively. Accordingly, as represented by the following Expression (3), the error signal E can be obtained based on the phase signals θA1 and θA2. In the following expressions, "x" is a relative displacement angle between the scale 100 and each of the sensors 111 and 112.

$$\theta A1 = (2\pi/9)x + E1(x) \quad (1)$$

$$\theta A2 = (2\pi/10)x + E2(x) \quad (2)$$

$$E = \theta A1 \times 9/10 - \theta A2 \quad (3)$$
$$= E1(x) \times 9/10 - E2(x)$$

Thus, the error signal generation unit 2 arranges the accumulated amounts of the phase changes of the two phase signals θ1 and θ2 (the phase signals θA1 and θA2) when the scale 100 and the sensor unit 1 are relatively displaced from each other by a predetermined displacement (for example, 90 degrees) so as to obtain the two accumulated phase signals. In this case, the error signal generation unit 2 multiplies a coefficient (for example 9/10) based on the periods of the two phase signals θ1 and θ2 by the accumulated amount (for example 20π) of the phase change of one (for example, the phase signal θ1) of the two phase signals. As a result, the accumulated amounts of the phase changes of the two phase signals θ1 and θ2 are equal to each other. Then, as represented by Expression (3), the error signal generation unit 2 obtains the difference of the two accumulated phase signals (for example, θA1×9/10 and θA2) and generates the error signal E where the accumulated phase component (for example 18π) corresponding to the predetermined displacement has been removed.

Next, a processing in the interpolation error detection unit 3 will be described. The interpolation error detection unit 3 averages the error signal E by both the periods of the phase signals θ1 and θ2 so as to detect the interpolation error E1(x) and E2(x) contained in the phase signals θ1 and θ2, respectively. The interpolation errors E1(x) and E2(x) are generated mainly because the two-phase sine wave signals contain offset errors, amplitude errors, and phase errors. An interpolation error component caused by these errors is an error having one period or two periods for one pitch of the track. Accordingly, since the interpolation errors E1(x) and E2(x) are assumed to be periodic functions that have periods equal to those of the tracks 101 and 102 respectively, the following Expressions (4) and (5) are met for an arbitrary "x". In Expression (4) and (5), "m" is an arbitrary integer.

$$E1(x) = E1(x+9m) \quad (4)$$

$$E2(x) = E2(x+10m) \quad (5)$$

When each of the interpolation errors E1(x) and E2(x) is averaged by the period of the phase signal θ1, i.e. the period of 9 degrees, the interpolation errors E1(x) and E2(x) are represented as the following Expressions (6) and (7) using Expressions (4) and (5), respectively. In Expressions (6) and (7), "n" is a sample number that is to be averaged.

$$\frac{1}{n}\sum_{k=0}^{n-1} E1(x+9k) = E1(x) \quad (6)$$

$$\frac{1}{n}\sum_{k=0}^{n-1} E2(x+9k) = \frac{1}{n}(E2(x) + E2(x+9) + \ldots + E2(x+9n-9)) \quad (7)$$
$$= \frac{1}{n}(E2(x) + E2(x-1) + \ldots + E2(x-n+1))$$
$$= \frac{1}{n}\sum_{k=0}^{n-1} E2(x-k)$$

Expression (7) indicates that averaging the interpolation error E2(x) that is the periodic function having a period of 10 degrees by using the period of 9 degrees is equivalent to averaging the interpolation error E2(x) while shifting the phase of it for each degree. As described above, the interpolation error E2(x) is generated mainly because of the error having one period or two periods. Therefore, when the sample number n is sufficiently large, this value converges to zero as represented by the following Expression (8).

$$\frac{1}{n}\sum_{k=0}^{n-1} E2(x-k) \approx 0 \qquad (8)$$

When the error signal E in which the interpolation errors E1(x) and E2(x) are mixed is averaged by using the period of the phase signal θ1, i.e. the period of 9 degrees, based on Expressions (6), (7), and (8), the component of the interpolation error E2 (x) converges to zero, and a value of E1(x)× 9/10 is obtained. Therefore, multiplying this value by 10/9, the interpolation error E1(x) can be calculated. Similarly, when the error signal E is averaged by using the period of the phase signal θ2, i.e. the period of 10 degrees, a value of −E2(x) can be obtained since the component of the interpolation error E1(x) converges to zero. Therefore, the interpolation error E2(x) can be calculated.

With respect to this averaging processing, when it is difficult to obtain the samples with the period of 9 degrees accurately, it is preferred that the phase be divided into predetermined regions in accordance with a necessary resolution so as to be averaged. For example, when the interpolation errors for each degree are calculated, first of all, a range of 9 degrees is divided into nine regions of region 0 to region 8 for each degree. Then, a plurality of samples are obtained and a region where each sample is included are obtained using the following Expression (9) based on the value of the phase signal 01 of each sample. In Expression (9), "i" is an index of the region. Then, separating each sample for each region and averaging the samples for each region, the effect similar to that described above can be obtained.

$$i \le \theta 1 \times 9/(2\pi) < i+1 \qquad (9)$$

The interpolation errors E1(x) and E2(x) are changed in accordance with relative position relationship between the scale 100 and the sensors 111 and 112 respectively, and the interpolation errors are increases as the position is displaced from an ideal position. For example, in the rotary encoder as described in the present embodiment, when the position displacement in a radial direction is generated, the pitches of the tracks 101 and 102 at detection positions of the sensors 111 and 112 are changed. According to this, the phase difference between the two-phase sine wave signals outputted from the sensors 111 and 112 are also changed. If the pitch of the track 101 at the detection position of the sensor 111 is changed from 9 degrees to 9+φ degrees, the phase difference of the two-phase sine wave signals is changed from 90 degrees to 90+φ/10 degrees. Therefore, the interpolation error "e" caused by the pitch change is represented by the following Expression (10). In Expression (10), "a tan 2(Y,X)" is an arctangent value in four quadrants, and "θ" is a phase in the pitch.

$$e = a\tan2(\sin(\theta - \varphi/20), \cos(\theta + \varphi/20)) - \theta \qquad (10)$$
$$= \varphi/10, \cos 2\theta - \varphi/20$$

Accordingly, obtaining amplitude of the interpolation error e that has two periods generated for each pitch of the track 101, the pitch at the detection position of the sensor 111 is calculated. When the pitch of the track 101 is calculated, the determination as to whether the position shift of the sensor 111 is within an allowable range can be performed because the relative position between the track 101 and the sensor 111 can be assumed. In the present embodiment, the interpolation errors E1(x) and E2(x) are detected by averaging the interpolation signal E by using both the periods of the two phase signals θ1 and θ2, but the present embodiment is not limited to this. If a sufficient accuracy is obtained, the interpolation error contained in at least one of the phase signals only needs to be detected by averaging the error signal E by using at least one of the periods of the two phase signals.

Next, the processing in the interpolation error correction unit 4 will be described. The interpolation error correction unit 4 corrects at least one of the two phase signals θ1 and θ2 using the interpolation error so as to generate the corrected phase signals. In the present embodiment, the interpolation error correction unit 4 subtracts the interpolation errors E1(x) and E2(x) detected by the interpolation error detection unit 3 from the phase signals θ1 and θ2 so as to generate the corrected phase signals θC1 and θC2. However, if the corrected phase signals θC1 and θC2 are less than zero or not less than 2π, the value of 2π is added or subtracted so that the corrected phase signals θC1 and θC2 meet 0≤θC1<2π and 0≤θC2<2π. Using the phase signal that is obtained by this correction processing, highly-accurate position detection can be performed with a small influence of the interpolation error.

Figure 2D:
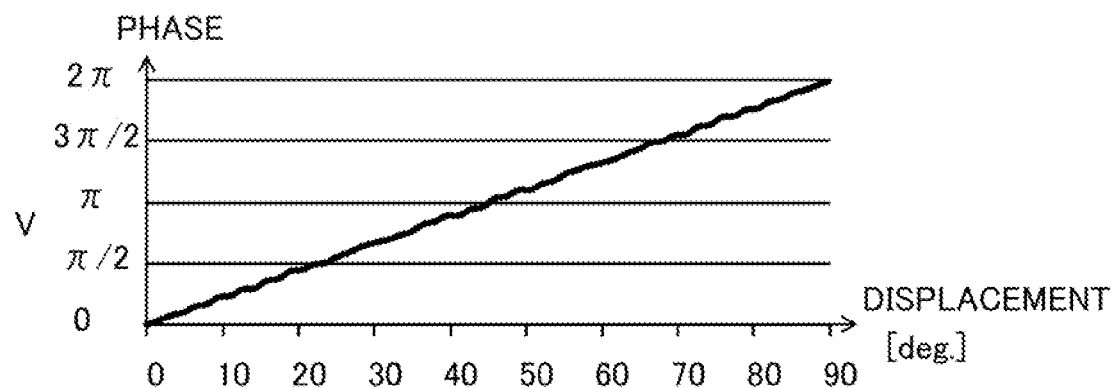

Next, the processing in the absolute position detection unit 5 will be described. The absolute position detection unit 5 detects the absolute position of the scale 100 (the object to be measured) with reference to the sensors 111 and 112 using the corrected phase signals θC1 and θC2 corrected by the interpolation error correction unit 4. First of all, a phase difference signal V of the corrected phase signals θC1 and θC2 is obtained. The corrected phase signals θC1 and θC2 only take values from 0 to 2π, similarly to the phase signals θ1 and θ2. Then, calculating a difference θC1−θC2 of the corrected phase signals and adding the value of 2π in a range where θC1−θC2<0 is met, the phase difference signal V is obtained. FIG. 2D illustrates a relationship between the phase difference signal V and the displacement.

Figure 2E:
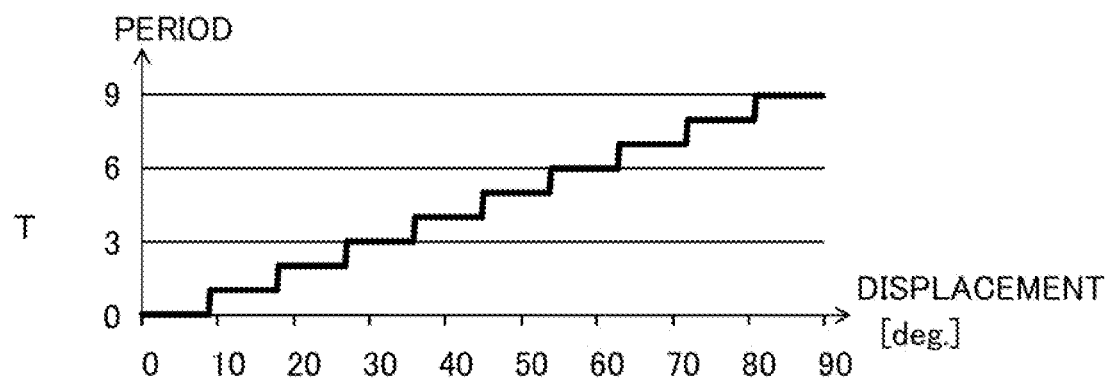
Figure 2F:
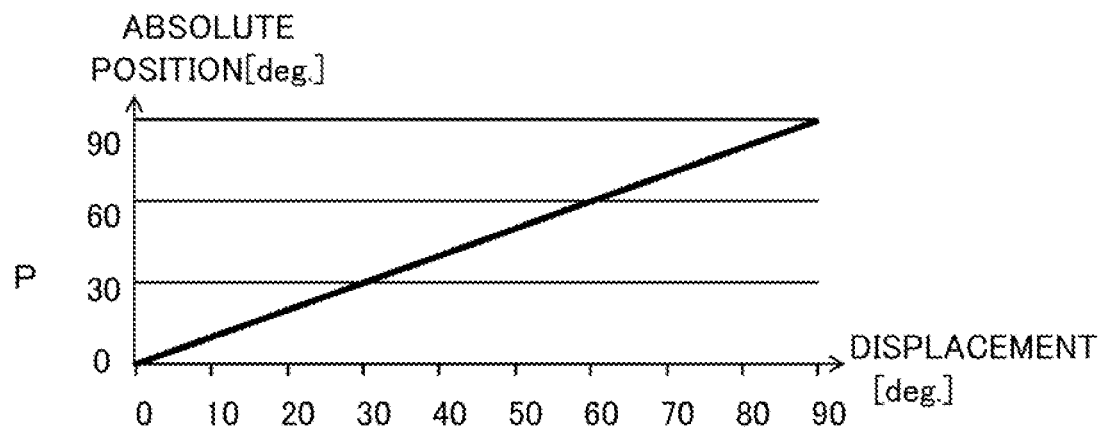

In the present embodiment, when the scale 100 and the sensors 111 and 112 are relatively displaced from each other by 90 degrees, the phase difference signal V having one period is generated. Therefore, the phase difference signal V indicates the absolute position of the object (the object to be measured) in a range of 90 degrees. However, the phase difference signal V has a large amount of error compared to the corrected phase signals θC1 and θC2, and therefore it has low displacement resolution for the phase difference amount. Accordingly, the number of periods of the corrected phase signal θC1 is obtained based on the value of the phase difference signal V, and the absolute position within one period is calculated by using the corrected phase signal θC1. As a result, the absolute position can be detected with higher accuracy. When the number of periods of the corrected phase signal θC1 is T and the absolute position of the corrected phase signal θC1 is P, T and P are obtained by the following Expressions (11) and (12), respectively. In Expressions (11) and (12), "ROUND (r)" is an integer closest to r, and "T" is an integer not less than zero. FIG. 2E illustrates a relationship between the period T and the displacement. FIG. 2F illustrates a relationship between the absolute position P and the displacement.

$$T=\text{ROUND}((V \times 10-\theta C1)/(2\pi)) \qquad (11)$$

$$P=T \times 9+\theta C1/(2\pi) \times 9 \text{ [deg.]} \qquad (12)$$

In the configuration described above, the absolute position of the object to be measured can be obtained.

The present embodiment describes the rotary encoder, but is not limited to this and for example can also be applied to a linear encoder. The encoder of the present embodiment can also be applied to an encoder which obtains an interpolation error to perform product inspections. In this case, it is not necessary to provide the interpolation error correction unit 4 and the absolute position detection unit 5. The absolute position of the present embodiment means a position of the scale 100 (the object) with reference to the sensors 111 and 112. The absolute position detector of the present embodiment can detect the position of the scale with respect to the sensor in one detecting operation (which is not a change with respect to a position before a unit time) while a conventional encoder detects a position change. The absolute position of the present embodiment means such a position that can be detected in the present embodiment.

According to the present embodiment, since the interpolation error can be detected without using a reference encoder, the manufacturing cost of the encoder can be reduced. In addition, a correction residual error that is caused by an attachment error of the reference encoder is not generated. Furthermore, a corrected value can be readjusted in a state where the encoder is incorporated. Therefore, according to the present embodiment, a highly-accurate encoder can be provided at low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-285283, filed on Dec. 27, 2011, which is hereby incorporated by reference herein in its entirety.

What is claimed is:

1. An encoder comprising:

a sensor configured to illuminate light on a single scale to detect two phase signals having periods different from each other;

an error signal generator configured to arrange accumulated amounts of phase changes of the two phase signals when the scale and the sensor are relatively displaced from each other by a predetermined displacement so as to obtain two accumulated phase signals, and to obtain a difference between the two accumulated phase signals so as to generate an error signal that is obtained by removing an accumulated phase component corresponding to the predetermined displacement; and an interpolation error detector configured to average the error signal by using at least one of periods of the two phase signals so as to detect an interpolation error contained in at least one of the two phase signals.

2. The encoder according to claim 1, wherein the error signal generator multiplies a coefficient based on the periods of the two phase signals by one of the accumulated amounts of phase changes of the two phase signals so that the accumulated amounts of the phase changes of the two phase signals are equal to each other.

3. The encoder according to claim 1, wherein the interpolation error detector averages the error signal by using both of the periods of the two phase signals so as to detect the interpolation error.

4. The encoder according to claim 1, further comprising an interpolation error corrector configured to correct the phase signals using the interpolation error so as to generate corrected phase signals.

5. The encoder according to claim 4, further comprising an absolute position detector configured to detect an absolute position of the scale using the corrected phase signal.

* * * * *